United States Patent [19]
Kawahara

[11] Patent Number: 4,751,770
[45] Date of Patent: * Jun. 21, 1988

[54] CLASPING DEVICE

[75] Inventor: Akira Kawahara, Kagawa, Japan

[73] Assignee: Ryusyo Industrial Co., Ltd., Osaka, Japan

[*] Notice: The portion of the term of this patent subsequent to Jun. 5, 2001 has been disclaimed.

[21] Appl. No.: 861,312

[22] PCT Filed: Aug. 29, 1985

[86] PCT No.: PCT/JP85/00475
§ 371 Date: Apr. 30, 1986
§ 102(e) Date: Apr. 30, 1986

[87] PCT Pub. No.: WO86/01568
PCT Pub. Date: Mar. 13, 1986

[30] Foreign Application Priority Data

Sep. 4, 1984 [JP] Japan ............... 59-134707[U]
Aug. 23, 1985 [JP] Japan ............... 60-129358[U]
Aug. 23, 1985 [JP] Japan ............... 60-129359[U]

[51] Int. Cl.⁴ ................................... A43C 11/00
[52] U.S. Cl. ..................... 24/68 CD; 24/69 ST
[58] Field of Search ........... 24/68 CD, 69 ST, 69 R, 24/69 CT, 71 ST, 71 TT, 302, 376, 328, 132 WL, 134 KB, 170, 193

[56] References Cited

U.S. PATENT DOCUMENTS 3,574,246 4/1971 Norton et al. .......... 24/68 CD
4,054,971 10/1977 Kawahara ............. 24/68 CD
4,102,018 7/1978 Kawahara ............. 24/68 CD
4,451,956 6/1984 Kawahara ............. 24/68 CD
4,527,309 7/1985 Kawahara ............. 24/68 CD
4,584,741 4/1986 Kawahara et al. ...... 24/68 CD

FOREIGN PATENT DOCUMENTS 155940 5/1952 Australia ................ 24/170

Primary Examiner—Kenneth J. Dorner
Assistant Examiner—Laurie K. Cranmer
Attorney, Agent, or Firm—Wenderoth, Lind & Ponack

[57] ABSTRACT

The present invention is drawn to a clasping device for fixing a cargo item such as an automobile on a load carrying platform. The main assembly (A) of the clasping device has a body (B) and lever (C). Body (B) includes a main body ($B_1$) and a sub-body ($B_2$). The main body ($B_1$), the sub-body ($B_2$) and the lever (C) are pivotally connected to each other by pins ($8a$, $8b$). In the release condition, the main body ($B_1$) and the sub-body ($B_2$) are bent and form a V-shape in association with each other due to the tension exerted and remaining on the strap (21).

4 Claims, 5 Drawing Sheets

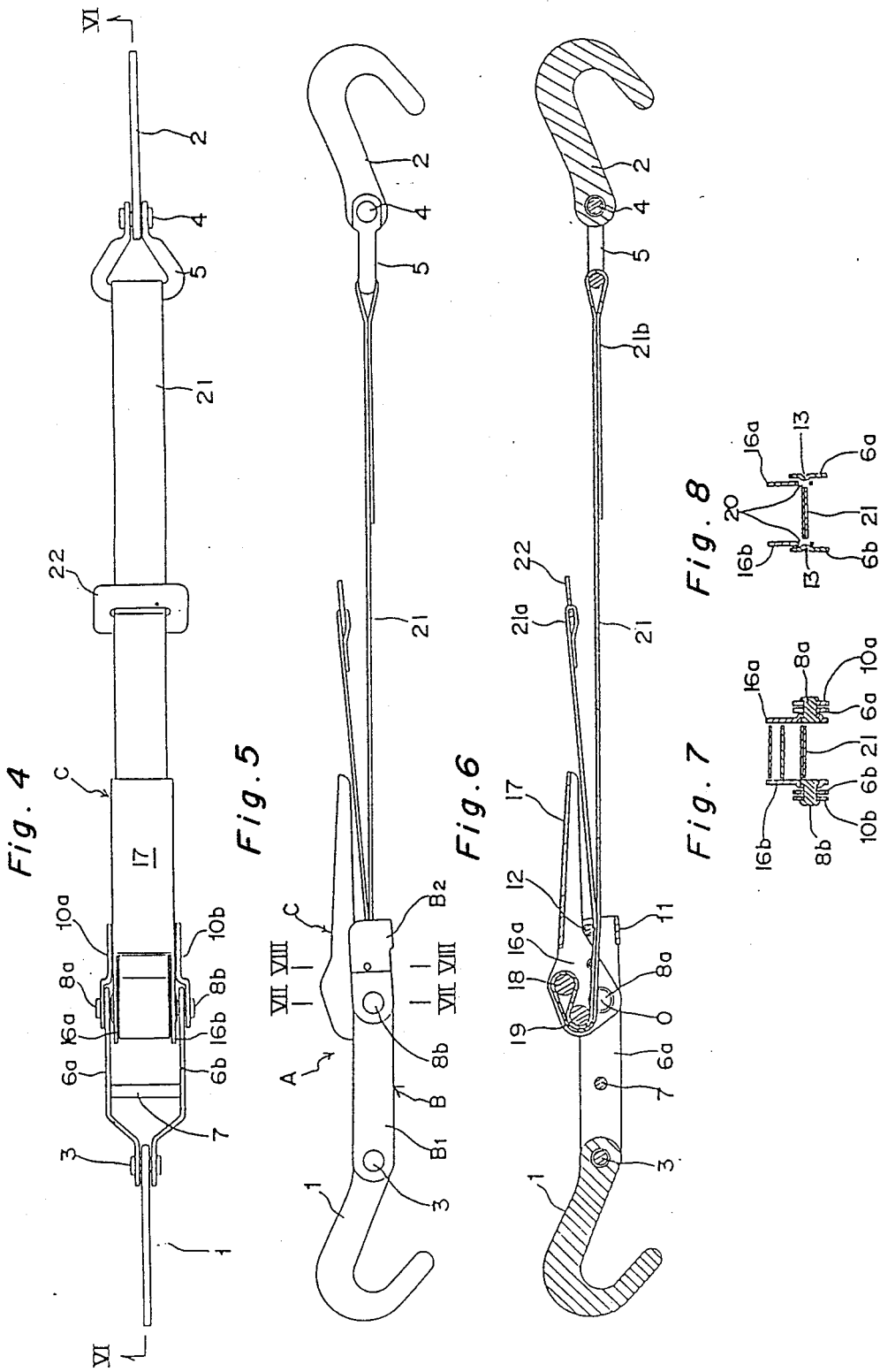

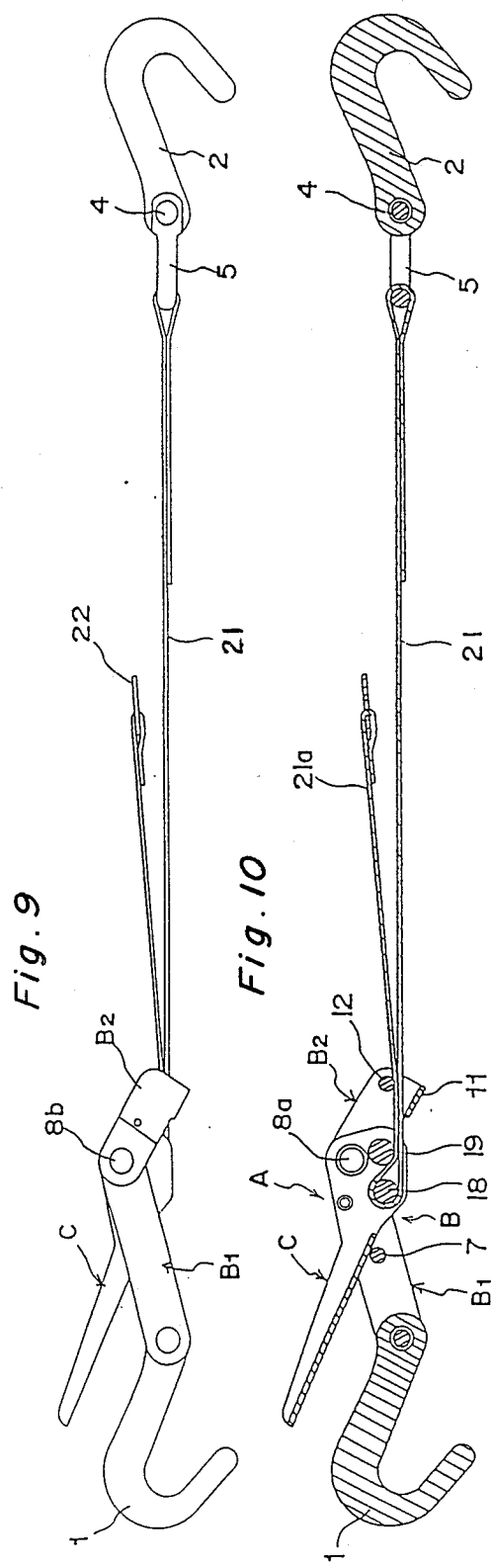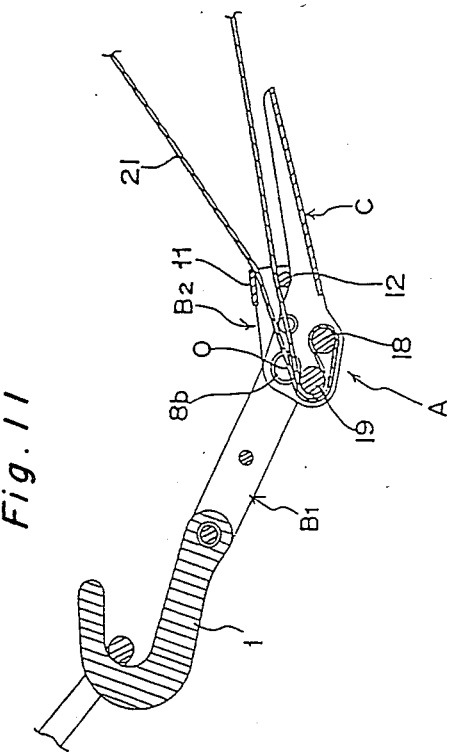

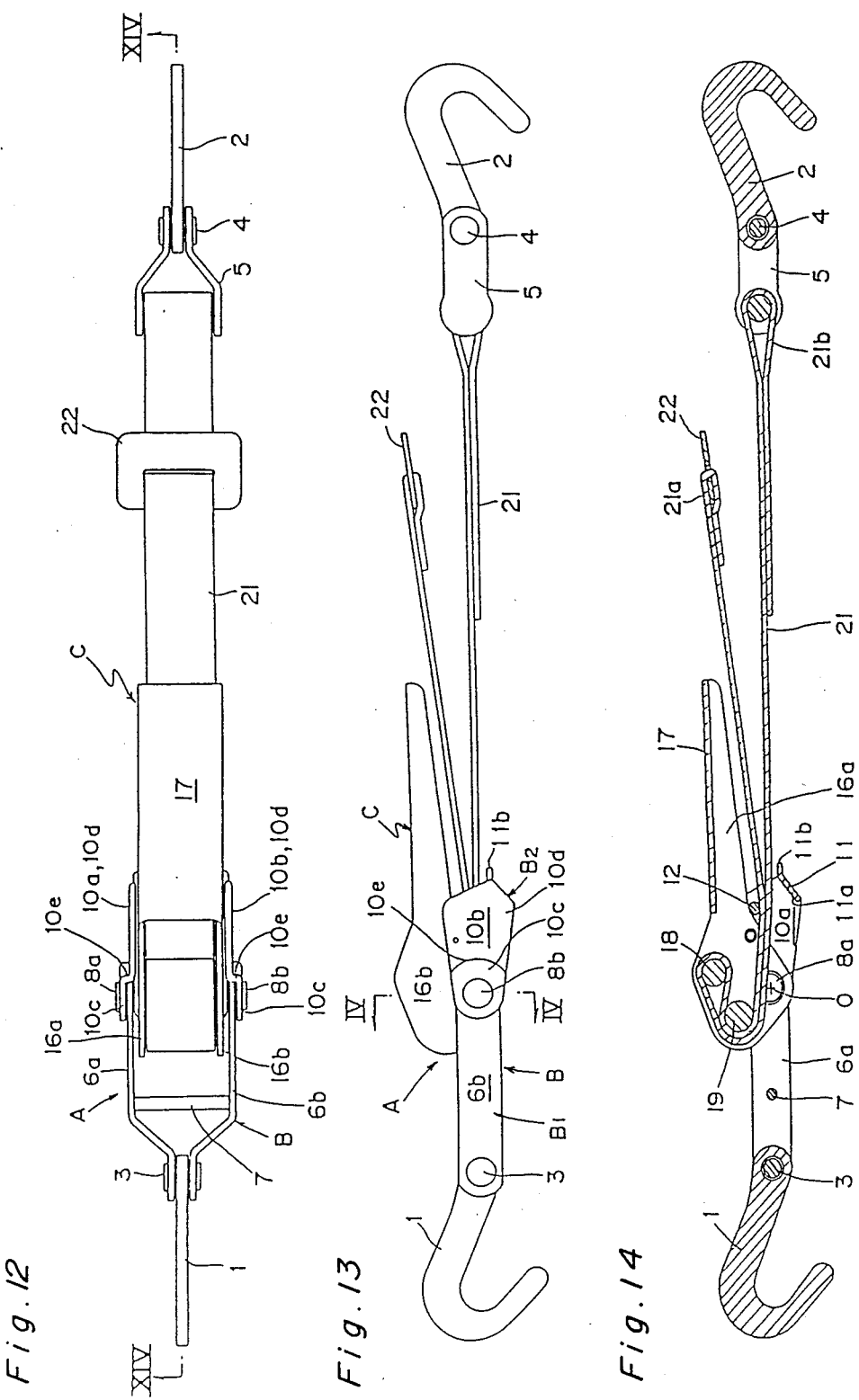

CLASPING DEVICE

BACKGROUND OF THE INVENTION

1. Field of the Invention

The present invention relates to a clasping device for fixing a cargo item such as an automobile on a load-carrying platform of a transporting means such as a ship or vehicle.

2. Description of the Related Art

The applicant of the present patent application has previously provided a clasping device, disclosed in Japanese utility model publication No. 52175/1981, which is compactly assembled, durable, reliable and easily handled. Such a clasping device is indicated in FIGS. 1 to 3. This clasping device has a main assembly A which includes a body B and a lever C pivotally connected to the body B by means of a pair of pins 8a and 8b. When the lever C is pivoted with respect to a body B from the release position to a tightening position, a strap turning shaft 18 and a strap pressing shaft 19, respectively mounted between a pair of sidewalls of the lever C, revolve about the pins 8a and 8b so that the strap 21 is tightened.

The construction of the above clasping device will be described in more detail hereinafter. A first hook 1 is directly connected to a left end portion of the body B, as viewed in FIGS. 1 to 3. The strap 21 has one end portion 21b, to which a second hook 2 is connected, and a opposite end portion 21a which is inserted into the body B from the right side thereof to be connected to the body B. Namely, the end portion 21a of the strap 21 is externally wound around the strap turning shaft 18 after having passed the strap pressing shaft 19. The body B has, at its right end portion, two guide members arranged at the upper and lower positions with respect to the strap 21 to be inserted, i.e. a connecting shaft 12 for supporting the lever C in the tightening position, and a connecting wall 11 to which the corresponding portion of the strap 21 contacts when the main assembly A is turned upside down from the normal position shown in FIGS. 2 and 3. The end portion 21a of the strap 21 is inserted into the body B through the space between the pair of guide members 11 and 12. Furthermore, the lever C and the body B have, respectively, a pair of sidewalls each having anchor means 20 and 13.

The clasping device, as described above, is preferably used for the purpose of fixing an automobile having a relatively light weight. Therefore, the size of the entire clasping device is designed so as to be relatively small. However, with regard to making the clasping device small, the dimension of the vertical width of the body B is not sufficiently small. Conventionally, the vertical width of the body B can not be made sufficiently small for the following reason. As shown in FIG. 3, when the lever C is in the release position, the portion of the strap 21 between the strap turning shaft 18 and the second hook 2 is held straight. That is to say, the pins 8a and 8b are mounted on positions of the corresponding sidewalls of the body B that allow above-mentioned straight condition of the strap 21 to be effected. If the pins 8a and 8b are mounted at lower positions on the body B, the vertical width of the body can be made smaller as a matter of course, but the strap turning shaft 18 and the strap pressing shaft 19 disadvantageously take a position below the connecting wall 11, so that the strap 21 bends around the connecting wall 11. Under this condition, when the strap 21 is pre-tightened by pulling the end portion 21a of the strap 21, the strap is rubbed against the connecting wall 11, so that the operation of pre-tightening the strap 21 is becomes disadvantageously very difficult. Accordingly, the pins 8a and 8b must be mounted at the relatively high position of the sidewalls on the body B, resulting in the vertical width of the body B being made necessarily large.

The problem, as described above, is due to the fact that the pins 8a and 8b are mounted at fixed position on the body B so that the positional relationship of the connecting wall 11 and the pins 8a and 8b can not be changed when moving the lever C between the release and tightened conditions.

It is, therefore, an object of the present invention to provide a clasping device wherein the positional relationship of the pins 8a and 8b with respect to the connecting wall 11 are changed in when moving the lever C between the release and tightened conditions so that the portion of the strap 21 between the strap turning shaft 18 and the second hook 2 can be held straight when the lever is in the release position.

SUMMARY OF THE INVENTION

In accomplishing this object, according to the present invention there is provided an improvement of a clasping device of the type, as described above, wherein the body of the main assembly comprises a main body having a pair of sidewalls which are respectively connected to the first hook, and a sub-body which has a pair of sidewalls including the connecting shaft and the connecting wall arranged therebetween and the corresponding anchor means, the sidewalls of the main body and the corresponding sidewalls of the sub-body being pivotally connected to each other by means of pins.

With the construction of the clasping device as described above, when the strap in the release condition is subject to a slight tension, the portion of the strap between the strap turning shaft and the second hook becomes substantially straight, and the main body and the sub-body form V-shape in association with each other since the pins easily move upwardly together with the main body, while the two guide members, i.e. the connecting shaft and the connecting wall are moved by the strap under the slight tension so that the sub-body rotates about the pins with respect to the main body. That is to say, none of the guide members hinder the straight of the portion of the strap between the strap turning shaft and the second hook. Therefore, the operation of pre-tightening of the strap can be easily effected since the friction between the strap and the guide members is very small.

With the construction of the clasping device according to the present invention, the connecting wall is preferably formed curved or bent in the direction of the tension of the strap so as to be convex with respect to the strap so that, when the strap moves with respect to the main assembly, the strap does not contact the edges of the connecting wall. With this preferable construction, damage of the strap due to friction between it and the connecting wall is reduced greatly. It is to be noted that if the strap contacts the edges of the connecting wall, the damage of the strap is quite severe since the friction between the strap and the edges of the connecting wall is very large.

Furthermore, in the above construction of the clasping device, one of the sidewalls of the main body or the sidewalls of the sub-body have, preferably, stopping means at predetermined portions thereof which engage, in the release condition, with predetermined portions of the sidewalls of the sub-body or the main body so that the angle formed by the main body and the sub-body is limited to such an extent that the anchor means of the main body or the sub-body is prevented from intruding into the other of the corresponding sidewalls, resulting in that easy operation of lever can be effected.

The preferred embodiments of the present invention will be described hereinafter.

BRIEF DESCRIPTION OF THE DRAWINGS

FIGS. 4 and 5 are, respectively, a top plan view and a side elevational view of a clasping device in the tightening condition according an embodiment of the present invention, FIG. 6 is a sectional view taken along line VI—VI in FIG. 4, FIGS. 7 and 8 are sectional views respectively taken along lines VII—VII and VIII—VIII in FIG. 5, FIGS. 9 and 10 are a side elevational view and a sectional view of the clasping device in the release condition according to the present invention, FIG. 11 is a partial sectional view showing a condition in which the main assembly of the clasping device shown in FIGS. 4 to 10 is upside down, FIGS. 12, 13 and 14 are, respectively, a top plan view, a side elevational view and a sectional view of a clasping device according to another embodiment of the present invention.

It is to be noted that like parts are designated by like reference numerals and symbols throughout the several views of the accompanying drawings.

DETAILED DESCRIPTION OF THE PREFERRED EMBODIMENTS

Figure 1:
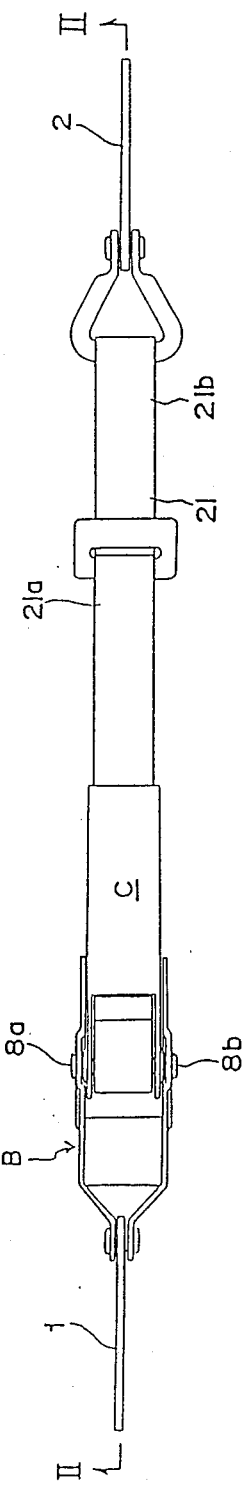
FIG. 1 is a top plan view showing a clasping device in the tightening condition according to a prior art device, as already described hereinbefore.
Figure 2:
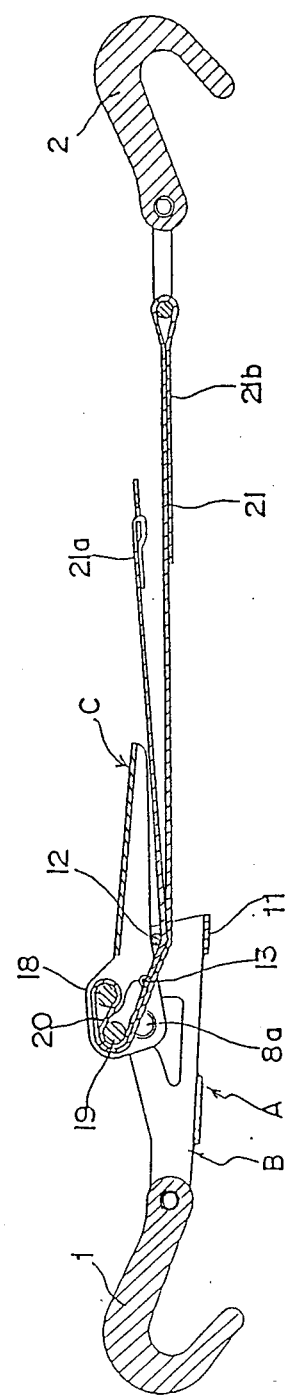
FIG. 2 is a sectional view taken along line II—II in FIG. 1.
Figure 3:
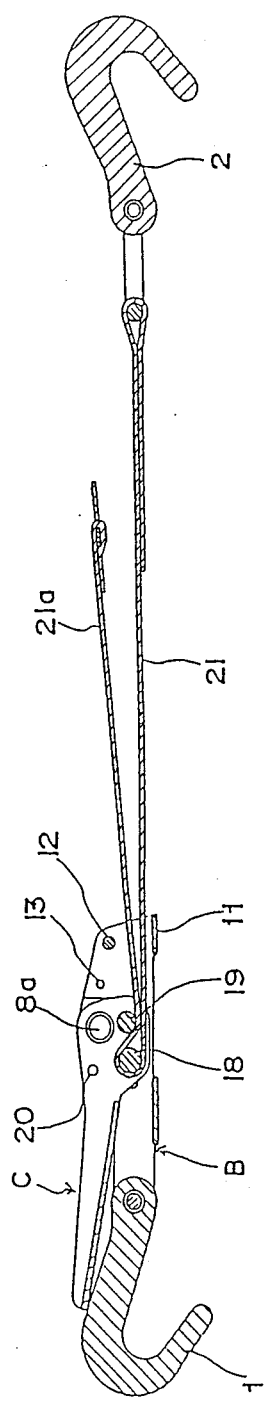
FIG. 3 is a view similar to FIG. 2, but showing the clasping device in the release condition.

The clasping device shown in FIGS. 4 to 11 has substantially the same schematic construction as that of the prior art device shown in FIGS. 1 to 3. Namely, a main assembly, generally indicated by a reference symbol A, comprises a body B and a lever C pivotally connected to the body B. A first hook 1 is directly connected by means of pin 3 to the left end portion, as viewed in FIGS. 1 to 3. A strap, indicated by a reference numeral 21, has a first end portion 21a, which extends around a strap turning shaft 18 and a strap pressing shaft 19, and a second end portion 21b to which a second hook 2 is connected by means of a connecting member 5 and pin 4. When the lever C is in a tightening position as shown in FIGS. 4 to 6, the strap 21 is tightened, while when the lever C is in a release position as shown in FIGS. 9 and 10, the strap is released.

The body B comprises a main body $B_1$ and a sub-body $B_2$ connected to the main body $B_1$. The main body $B_1$ has a pair of sidewalls 6a and 6b facing each other. As shown best in FIG. 4, the sidewalls 6a and 6b have, respectively left bent end portions which sandwiche the base end portion of the first hook 1 and are pivotally connected to it by means of a pin 3. A reinforcement shaft 7 is mounted between the pair of sidewalls 6a and 6b.

Meanwhile, the sub-body $B_2$ comprises a pair of sidewalls 10a and 10b facing each other, and a pair of guide members, i.e. a connecting shaft 12 and a connecting wall 11, which, respectively, connecting the right end portions of the sidewalls 10a and 10b to each other. The left end portions of the sidewalls 10a and 10b are fitted over the right end portions of the sidewalls 6a and 6b of the main body $B_1$ and are connected to them by means of the corresponding pins 8a and 8b. Therefore, the sub-body $B_2$ can pivot about the pins 8a and 8b with respect to the main body $B_1$.

The lever C comprises a pair of sidewalls 16a and 16b face each other, a connecting wall 17 for connecting tip end portions of the sidewalls, and a pair of shafts, i.e. a strap turning shaft 18 and a strap pressing shaft 19, respectively mounted between the base end portions of the sidewalls 16a and 16b. The base end portions of the sidewalls 16a and 16b are fitted into the right end portions of the sidewalls 6a and 6b of the main body $B_1$ and connected to the sidewalls of the main body $B_1$ and sub-body $B_2$ by means of the pins 8a and 8b. The sidewalls 16a and 16b, respectively, have, at predetermined positions, engaging holes 20. Meanwhile, the sidewalls 10a and 10b, respectively, have, at predetermined positions, anchor projections 13 that project inwardly. When the lever C is in the tightening position, the anchor projections 13 detachably engage with the corresponding engage holes 20.

The first end portion 21a of the strap 21 is extends around the strap turning shaft 18 and the strap pressing shaft 19, as shown best in FIG. 6. Namely, the first end portion 21a of the strap 21 is, first, inserted into the sub-body $B_2$ through the space between the connecting shaft 12 and the connecting wall 11, subsequently wrapped around the strap turning shaft 18 after having passed the strap pressing shaft 19, and finally led out of the sub-body $B_2$ through the space between the guide members 11 and 12. A stopper plate 22 is connected to the first end portion 21a of the strap 21 in order to prevent the strap 21 from accidentally slipping out of the lever C.

With the construction of the embodiment of the present invention, as described above, when the lever C is in the tightening position as shown in FIGS. 4 to 6 to fix the strap 21, the lever C is supported by the connecting shaft 12, and the portion of the strap 21 between the connecting shaft 12 and the strap pressing shaft 19 is in an upper position above the center O of the pins 8a and 8b so that the lever C is constantly urged toward the tightening position by the strap 21 under heavy tension. Accordingly, the lever C can be held in the tightening position with respect to the body B without the specific stopper means. Needless to say, the anchor projections 13 engage, in the tightening condition, with the corresponding engaging holes 20 so that the lever C and the body B are rigidly fixed to each other, resulting in that potential vibration of the lever C with respect to the body B is effectively avoided.

Meanwhile, as shown in FIGS. 9 and 10, when the lever C is rotated to the release position with respect to the body B, the portion of the strap 21 between the second hook 2 and the strap turning shaft 18 becomes straight due to the remaining slight tension on the strap 21, so that the pins 8a and 8b will move upwardly, as shown. The main body $B_1$ and sub-body $B_2$, which are pivotally connected to the pins 8a and 8b, subsequently, will become subject to the tension of the strap 21. That is to say, as shown in FIGS. 9 and 10, the main body $B_1$ and the sub-body $B_1$ forms a V-shape. Therefore, the strap 21 is not bent by the guide members 11 and 12. Thus, when the first end portion 21a of the strap is pulled during the pre-tightening operation, the friction between the strap 21 and the guide members 11 and 12 is very small. Accordingly, the pre-tightening operation of the strap 21 is effected quite easily.

The clasping device is usually used in the condition as shown in FIGS. 4 to 6. However, the clasping device may accidentally turn upside down as shown in FIG. 11. Namely, when the strap 21 accidentally loosens the main assembly A may turn upside down since the lever C is heavy. It is to be noted that the lever C is usually prevented from easily releasing even when the clasping device is in this accidental condition. This is because, when the main assembly A turns upside down, the strap 21 contacts the connecting wall 11, and accordingly the portion of the strap 21 between the connecting wall 11 and the strap pressing shaft 19 is held at the lower position below the center O of the pins 8a and 8b. Thus, in this condition, even if the strap 21 is suddenly pulled again, the lever C is urged toward the tightening position by the tension of the strap 21 so that the lever C will not accidentally rotate to the release position. Needless to say, when the anchor projections 13 disengage from the corresponding engaging holes 20, the said portion of the strap 21 may eventually assume the upper position above the center O of the pins 8a and 8b. In this case, when the strap 21 is suddenly pulled, the lever C may be rotated toward the release position as a matter of course.

As apparent from the foregoing description, according to the above embodiment of the present invention, since the body B comprises the main body $B_1$ and the sub-body $B_2$ which are pivotally connected to each other by means of the pins 8a and 8b so that, in the release condition, the main body $B_1$ and the sub-body $B_2$ form a V-shape, resulting in that the positional relationship between the pins 8a and 8b and the the guide members 11 and 12 is different from that in the tightening condition, the vertical width of the body B including the main body $B_1$ and sub-body $B_2$ can be made very small and the sidewalls of the body B can be substantially rectangular.

Another embodiment of the present invention is shown in FIGS. 12 to 15. As shown best in FIG. 12, the left half portion 10c of each sidewall 10a and 10b of the sub-body $B_2$ projects outwardly from the right half portion 10d thereof. The left and right half portions of the sidewalls 10a and 10b are connected to each other by means of the corresponding shoulder portions 10e which is substantially semi-circular, as viewed in FIG. 13.

The connecting wall 11 is bent along the direction exerted on the tension of the strap so as to be convex in a direction away from the strap 21 so that, when the lever C is in the release position, the strap 21 does not the edges 11a and 11b of the connecting wall 11.

With the construction of the second embodiment, as described above, the anchor projections 13 of the lever C are advantageously prevented from encroaching toward the outer surface of the sidewalls 16a and 16b. More specifically, as shown best in FIG. 15, in the release condition, the lever C is supported by the reinforcement shaft 7 of the main body $B_1$, while the sub-body $B_2$ is positioned with respect to the main body $B_1$ in such a manner that the inner and lower surface of the shoulder portions 10e of each sidewall 10a and 10b engage with the lower peripheral surfaces of each sidewall 6a and 6b of the main body $B_1$. It is to be noted that, if the sub-body $B_2$ does not have shoulder portions, since the strap 21 under slight tension urges the sub-body $B_2$ in a clockwise direction, the anchor projections 13 possibly encroach toward the outer surface of each sidewall 16a and 16b of the lever C, resulting in that the operation of turning the lever C toward the tightening position would become quite difficult.

Figure 15:
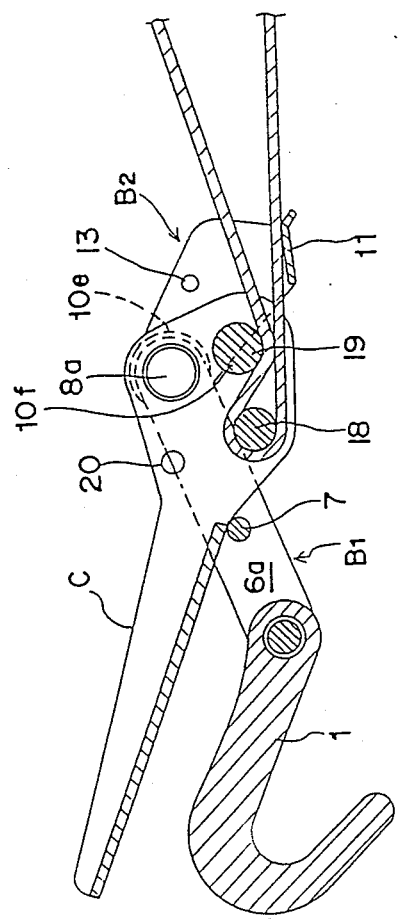
FIG. 15 is an enlarged partial sectional view of the clasping device shown in FIG. 13 in the release condition.

Furthermore, since the connecting wall 11 has a V-shaped configuration, even when the position of the sub-body $B_2$ changes with respect to the strap 21 in the release and tightening conditions, namely even if the sub-body $B_2$ rotates clockwise, as viewed in FIG. 15, with respect to the main body $B_1$ in the release condition, the strap 21 does not contact the one end portion 11a of the connecting wall 11, so that the operation of pre-tightening the strap 21 can be performed very smoothly and the damage of the strap 21 is very small. This will be easily understood if the second embodiment is compared with the first embodiment shown in FIG. 10. In FIG. 10, since the connecting wall 11 is only a flat plate, the left edge of the connecting wall 11 becomes in contact with the strap 21 in the release condition. Therefore, when the strap 21 is shifted with respect to the main assembly A, the strap 21 rubs against the left edge of the connecting wall 11, resulting in severe damage of the strap 21.

What is claimed is:

1. A clasping device comprising:
   a main body having a pair of spaced apart and opposing main body sidewalls;
   a hook securing means connected to the main body at one end of said main body sidewalls;
   a sub-body pivotally connected to said main body, said sub-body having a pair of spaced apart and opposing sub-body sidewalls, first anchor means at a predetermined location on said sub-body sidewalls, a connection shaft extending between said sub-body sidewalls at one end of said sub-body sidewalls, and a connecting wall extending between said sub-body sidewalls at said one end of said sub-body sidewalls and spaced from said connecting shaft;
   pin means connecting the other end of said main body sidewalls to the other end of the sub-body sidewalls for pivotally connecting said main body and said sub-body;
   a lever having a pair of spaced apart and opposing lever sidewalls, said lever sidewalls being pivotally connected to and between said spaced apart sidewalls of said main body and said sub-body by said pin means, said lever pivoting between a first position and a second position relative to said main body and said sub-body, said lever abutting against said connecting shaft when at said second position,
   said lever having second anchor means at a predetermined location on said lever sidewalls for engaging said first anchor means of said sub-body when said lever is at said second position to detachably secure said lever to said sub-body when at said second position, a strap turning shaft extending between said lever sidewalls, and a strap pressing shaft extending between said lever sidewalls and spaced from said strap turning shaft; and a strap having first and second end portions, said first end portion extending between said lever sidewalls from between said connecting shaft and said connecting wall, between said strap pressing shaft and said strap turning shaft, and around said strap turning shaft, and again between said connecting shaft and said connecting wall to said second end portion of said strap which extends outside of said lever;

said strap turning shaft and said strap pressing shaft being disposed between said lever sidewalls relative to said pin means such that when said lever is in said first position and tension is exerted on said second end portion of the strap, the first end portion of the strap is relatively easily slidable over the strap turning shaft, and when said lever is in said second position and tension is exerted on said second end of the strap, the first end portion of the strap is fixed relative to the lever around the strap pressing shaft and the strap turning shaft.

2. A clasping device as claimed in claim 1, wherein said connecting wall is convex in a direction toward the connecting shaft such that the strap passing therebetween when slid over the connecting wall in the direction in which the tension is exerted on the second end portion is not engaged by an edge portion of the connecting wall.

3. A clasping device as claimed in claim 1, wherein one of said main body sidewalls and said sub-body sidewalls has engaging portions thereon for engaging with a peripheral edge surface of the other of said main body sidewalls and said sub-body sidewalls when the main body and the sub-body are pivoted relative to each other at a predetermined angle to limit relative rotation of the main body and the sub-body about said pin means to said predetermined angle.

4. A clasping device comprising:

a lever having a pair of spaced apart and opposing lever sidewalls, a strap turning shaft extending between said lever sidewalls, a strap pressing shaft extending between said lever sidewalls, and a first anchor means;

a main body having a pair of spaced apart and opposing main body sidewalls between which an end portion of said lever is pivotally mounted to the main body, said lever moving between first and second positions relative to said main body, said main body having a first end portion comprising a hook securing means and a second end portion;

a strap having first and second end portions, said first end portion extending between said pair of lever sidewalls, between said strap pressing shaft and said strap turning shaft, and around said strap turning shaft, to said second end portion which extends outside of said lever;

a sub-body having an end portion pivotally connected to one of said pair of lever sidewalls and said pair of main body sidewalls, lever guide means for supporting said lever when said lever is in said first position, first and second strap guide means between which said first and said second end portions of said strap extend when said lever is in either of said first and said second positions, said first and said second strap guide means for confining said strap therebetween, and a second anchor means for engaging said first anchor means of said lever when said lever is in said first position for detachably securing said lever to said sub-body when said lever is in said first position, said first position being a strap tightening position at which the first end portion of the strap is fixed relative to the lever, and said second position being a strap loosening position at which the first end portion of the strap is relatively easily slidable over the strap turning shaft.

* * * * *